US007362215B2

(12) United States Patent
Janssen

(10) Patent No.: US 7,362,215 B2
(45) Date of Patent: Apr. 22, 2008

(54) SYSTEM AND METHOD FOR MONITORING THE SURROUNDINGS OF A VEHICLE

(75) Inventor: Holger Janssen, Hessisch Oldendorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/432,883

(22) PCT Filed: Oct. 13, 2001

(86) PCT No.: PCT/DE01/03931

§ 371 (c)(1),
(2), (4) Date: Nov. 5, 2003

(87) PCT Pub. No.: WO02/43982

PCT Pub. Date: Jun. 6, 2002

(65) Prior Publication Data

US 2004/0075544 A1 Apr. 22, 2004

(30) Foreign Application Priority Data

Nov. 29, 2000 (DE) ................................ 100 59 313

(51) Int. Cl.
*B60R 25/10* (2006.01)
*B60Q 1/00* (2006.01)
*H04N 7/18* (2006.01)

(52) U.S. Cl. ............................ 340/426.25; 340/425.5; 340/435; 340/903; 340/555; 348/148; 348/162

(58) Field of Classification Search ........... 340/426.25, 340/425.5, 435, 436, 903, 555, 556, 557; 180/167–169; 348/143, 148, 149, 152, 153, 348/162, 164

See application file for complete search history.

(56) References Cited

U.S. PATENT DOCUMENTS

| | | | | |
|---|---|---|---|---|
| 5,473,364 | A | 12/1995 | Burt | 348/47 |
| 5,675,326 | A * | 10/1997 | Juds et al. | 340/904 |
| 5,949,331 | A | 9/1999 | Schofield et al. | 340/461 |
| 6,150,930 | A | 11/2000 | Cooper | 340/435 |
| 6,429,420 | B1 | 8/2002 | Babst et al. | 180/232 |
| 6,580,373 | B1 * | 6/2003 | Ohashi | 340/901 |
| 2002/0005778 | A1 * | 1/2002 | Breed et al. | 340/435 |

FOREIGN PATENT DOCUMENTS

| | | |
|---|---|---|
| DE | 19801884 | 7/1999 |
| DE | 19932779 | 1/2001 |
| EP | 0505237 | 9/1992 |
| EP | 1 158 473 | 11/2001 |
| FR | 2730035 | 8/1996 |

(Continued)

OTHER PUBLICATIONS

Patent Abstracts of Japan, vol. 2000, No. 04, Aug. 31, 2000 & JP 2000 016181 A (Tokai Rika Co. Ltd.), Jan. 18, 2000.

*Primary Examiner*—Donnie L. Crosland
(74) *Attorney, Agent, or Firm*—Kenyon & Kenyon LLP

(57) ABSTRACT

A system and method for monitoring the surroundings of a vehicle, having sensors for detecting characteristics of the surroundings and means for processing the detected information. The sensors are optical sensors, at least two sensors are provided, the sensors operate in the wide-angle range, and the means for processing the detected information deliver spatial information.

18 Claims, 6 Drawing Sheets

FOREIGN PATENT DOCUMENTS

| | | |
|---|---|---|
| JP | 6068989 | 3/1994 |
| JP | 7159190 | 6/1995 |
| JP | 7223487 | 8/1995 |
| JP | 9266572 | 10/1997 |
| JP | 10501386 T | 2/1998 |
| JP | 11205817 | 7/1999 |
| JP | 11220758 | 8/1999 |
| JP | 2000 128031 | 5/2000 |

* cited by examiner

SYSTEM AND METHOD FOR MONITORING THE SURROUNDINGS OF A VEHICLE

FIELD OF THE INVENTION

The present invention relates to a system for monitoring the surroundings of a vehicle, including sensors for detecting the characteristics of the surroundings and means for processing the detected information. The present invention further relates to a method of monitoring the surroundings of a vehicle, including detecting characteristics of the surroundings and processing the detected information.

BACKGROUND INFORMATION

Numerous systems are known for monitoring the surroundings of a vehicle. Such systems are used, for example, for accident prevention ("pre-crash"), automatic cruise control (ACC), or observation of the blind spot with respect to the visual field of the driver. Systems are used for operating various sensors. Radar sensors, lidar sensors, ultrasound sensors, and video sensors, for example, are known. For example, radar sensors are used to determine the exact location of an object which is present in the surroundings of the vehicle. One conventional method for this determination of location is triangulation. In using the various sensors, however, consideration must be made for the fact that the sensors have different detection ranges due to their underlying physical processes. For this reason, it is often useful to combine the various sensors. Overall, this results in complex systems because of the necessity to combine the various sensor measurement data.

In addition, it must be noted that most systems are not capable of classifying objects which are present in the vehicle surroundings. A radar sensor is generally not able to distinguish between a living object, such as a pedestrian, and an inanimate object. Furthermore, radar sensors as well as ultrasound sensors have the disadvantage that in the immediate vehicle surroundings they are able to detect only a small region of the surroundings because of their small aperture angle. Thus, a large number of sensors is required if the entire vehicle surroundings are to be detected using such sensors.

SUMMARY

According to an example embodiment of the present invention, a system includes at least two optical sensors. The sensors operate in the wide-angle range. Means for processing the detected information deliver spatial information is also provided. Compared to the other referenced sensors, optical sensors have the advantage that they make it possible to classify objects in the vehicle surroundings. For example, it is possible to distinguish between an inanimate object and a living object. The fact that at least two sensors are provided allows a spatial determination of the vehicle surroundings. The two optical sensors act as a pair of stereo cameras. Because the sensors which detect a wide-angle range may have fundamentally different characteristics, it is possible to detect a large portion of the vehicle surroundings. Due to the fact that the means for processing the detected information deliver spatial information, a person, for example the driver of the vehicle, may receive detailed information about the characteristics of the vehicle surroundings. The processing in the means for processing is performed using algorithms for digital image processing, in addition to other algorithms, for evaluating the sensors. Based on the present invention, there may be an overall cost savings due to the fact that multiple individual sensors may be dispensed with for satisfactorily detecting the surroundings. In addition to the savings in numerous individual sensors, it is possible to reduce the complexity of the system. This is due to the fact that interconnection of a large number of sensors is not required.

Preferably, at least one of the sensors has a fisheye lens system. Fisheye lenses are suitable for detecting a large solid angle in the approximate range of 220°. Thus, a large portion of the surroundings of the motor vehicle may be detected. When multiple sensors are used, it is possible to deliver spatial information concerning the entire vehicle surroundings.

It may also be advantageous if at least one of the sensors has a lens system for detecting a viewing angle of 360°, in particular a parabolic lens system or a parabolic mirror lens system.

It may be particularly advantageous if additional sensors are provided for detecting additional characteristics of the surroundings, it being possible to supply information concerning the characteristics to the means for processing the detected information. In this manner, the example system according to the present invention is able to process the information from additional information sources. A large variety of sensors come into consideration, such as radar or ultrasound sensors. It is also possible to provide information which does not concern the vehicle surroundings. For example, steering angle sensors, yaw angle sensors, means for monitoring the vehicle locks, and vibration sensors may be taken into consideration as additional information sources for the system according to the present invention.

It may be particularly advantageous if additional optical sensors are provided. In this manner it is possible to improve the detection of the vehicle surroundings. For example, blind spots may be avoided.

It may also be advantageous if the means for processing the detected information have a controller. The controller is able to detect all information from the information sources involved, process it, and deliver appropriate spatial information. The controller makes use of algorithms for digital image processing, in addition to other algorithms, for evaluating the sensors.

The means for processing the detected information preferably deliver this information to a driver information system. The driver information system is able to present the information to the driver in a suitable manner. The information may be presented by optical, acoustical, or tactile means.

It may also be useful for the means for processing the detected information to deliver this information to an actuator system. It is thus possible to actively intervene in the vehicle state. For example, interventions in the engine control, brakes, clutch, or alarm system are possible.

It is preferable to provide means for producing light in the infrared spectral range, and the light may be emitted to the surroundings of the vehicle via the sensor lens system. It is thus possible to detect the vehicle surroundings, even when the ambient light is insufficient. To this end, the optical sensors must also be designed in such a way that they are able to detect in the infrared spectral range. Independent of the separate production of light in the infrared spectral range, this also has the advantage that it is possible to evaluate infrared radiation in the surroundings.

Since the sensor lens system may be used for detecting the light produced by the surroundings as well as for emitting the infrared light produced in the vehicle, a particularly efficient system is provided. LEDs may be used as economical sources of light in the infrared spectral range.

It may be particularly advantageous if an imager chip is provided which is sensitive in the near infrared spectral range. It is thus possible to detect in the infrared spectral range. Use of such an imager chip, in conjunction with a parabolic lens system, for example, produces an approximately annular image on the imager chip. It is advantageous when only this illuminated region of the imager chip is made of light-sensitive material, it being possible to use the remaining region of the image chip for the evaluation logic, for example.

The sensors are preferably mounted on the roof of a vehicle. It is thus possible to monitor the entire vehicle surroundings using only one camera and/or one pair of cameras. However, it is also possible to mount the sensors in the front region of the vehicle, optionally supplemented by an additional camera on the rear end of the vehicle. This may offer advantages, for example with regard to the ACC stop and go function. It is also possible to mount a pair of stereo cameras on the rear end of the vehicle, it being particularly useful in this case to mount an additional camera in the front region of the vehicle. This configuration is suited in particular for rear-oriented applications, such as for use as a backing-up camera.

It is particularly useful for the sensors to have an unobstructed visual field in the side region. If the sensors are mounted next to one another on the vehicle roof, for example, one sensor covers the visual field of the other sensor in the lateral direction. Blind spots are thus formed in the side region of the vehicle, which is particularly problematic. This situation may be corrected by offsetting the sensors with respect to one another so that unobstructed visual fields are present in the side region of the vehicle. This is particularly useful with respect to detection of the blind spot in the driver's visual field.

An example method according to the present invention includes optically detecting the characteristics. At least two sensors are provided for detecting the characteristics. The sensors operate in the wide-angle region. Means for processing the detected information deliver spatial information is also provided. The detected angle may assume a value up to that for a panoramic view. Compared to the other referenced sensors, optical sensors have the advantage that it is possible to classify objects in the vehicle surroundings. For example, it is possible to distinguish between an inanimate object and a living object. The fact that at least two sensors are provided allows a spatial determination of the vehicle surroundings. The two optical sensors act as a pair of stereo cameras. Because a wide-angle range is detected by the sensors, which may have fundamentally different characteristics, it is possible to detect a large portion of the vehicle surroundings. Due to the fact that the means for processing the detected information deliver spatial information, a person, for example the driver of the vehicle, may receive detailed information about the characteristics of the vehicle surroundings. The processing in the means for processing is performed using algorithms for digital image processing, in addition to other algorithms for evaluating the sensors. Based on an example embodiment of the present invention, there may be an overall cost savings due to the fact that multiple individual sensors may be dispensed with for satisfactorily detecting the surroundings. In addition to the savings in numerous individual sensors, it is possible to reduce the complexity of the system. This is due to the fact that interconnection of a large number of sensors is not required.

Preferably, at least one of the sensors has a fisheye lens system. Fisheye lenses are suitable for detecting a large solid angle in the approximate range of 220°. Thus, a large portion of the surroundings of the motor vehicle may be detected. When multiple sensors are used, it is possible to deliver spatial information concerning the entire vehicle surroundings.

It is particularly advantageous when at least one of the sensors has a lens system for detecting a viewing angle of 360°, in particular a parabolic lens system or a parabolic mirror lens system.

Preferably, additional sensors are provided for detecting additional characteristics of the surroundings, it being possible to supply information concerning the characteristics to the means for processing the detected information. In this manner the system according to the present invention is able to process the information from additional information sources. A large variety of sensors come into consideration, such as radar or ultrasound sensors. It is also possible to provide information which does not concern the vehicle surroundings. For example, steering angle sensors, yaw angle sensors, means for monitoring vehicle locks, and vibration sensors may be taken into consideration as additional information sources for the system according to the present invention.

The method may be carried out in a particularly advantageous manner when additional optical sensors are provided. It is thus possible to improve the detection of the vehicle surroundings. For example, blind spots may be avoided.

It may also be useful if the detected information is processed in a controller. The controller is able to detect all information from the information sources involved, process it, and deliver appropriate spatial information. The controller makes use of algorithms for digital image processing, in addition to other algorithms, for evaluating the sensors.

The method according to the present invention may be advantageously refined by delivering the processed information to a driver information system. The driver information system is able to suitably present the information to the driver. The information may be presented by optical, acoustical, or tactile means.

It may also be advantageous if the processed, detected information is sent to an actuating system. It is thus possible to actively intervene in the vehicle state. For example, interventions in the engine control, brakes, clutch, or alarm system are possible.

The example method may also be advantageous if light in the infrared spectral range is produced, and if the light is emitted to the surroundings of the vehicle via the sensor lens system. It is thus possible to detect the vehicle surroundings, even when the ambient light is insufficient. To this end, the optical sensors must also be designed in such a way that they are able to detect in the infrared spectral range. Independent of the separate production of light in the infrared spectral range, this also has the advantage that infrared radiation in the surroundings may be evaluated. Light in the infrared spectral range may also be emitted to the surroundings via other light sources, for example lens systems.

The present invention is based on the surprising knowledge that it is possible to use the total bandwidth of the algorithms present for digital image processing in the area of stereo-surround measurement. In particular, the possibility of making three-dimensional measurements of the entire detectable vehicle surroundings offers numerous advantages. By surveying the surroundings, it is possible, for example, to recognize objects, classify traffic signs, identify roadway boundaries, and detect human beings in the vehicle surroundings. The driver may also be provided with assistance, services, and applications by such a system. Applications in the area of active vehicle safety are possible. For example, a pre-crash sensor system, the calculation and performance of braking and avoidance maneuvers, support of stop and go, traffic lane recognition, ACC support, and automatic emergency braking may be implemented. Assistance systems such as traffic sign recognition and parking assistance may be implemented. Based on the present invention, a security system may also be supported which functions as an anti-theft warning device. To this end, the controller detects moving objects in the vehicle surroundings and sounds an alarm when an unidentifiable object appears which attempts to open the vehicle. It is also advantageous to note that objects in the vehicle surroundings may be classified using the optical information. On this basis it is possible to display video images, for example, to the driver, not only in direct form but also in modified form. In the modified display, the images may be equalized, for example, or detected objects may be highlighted depending on their importance.

BRIEF DESCRIPTION OF THE DRAWINGS

The present invention is explained by way of example, based on preferred embodiments with reference to the accompanying drawing.

DESCRIPTION OF EXAMPLE EMBODIMENT

Figure 1:
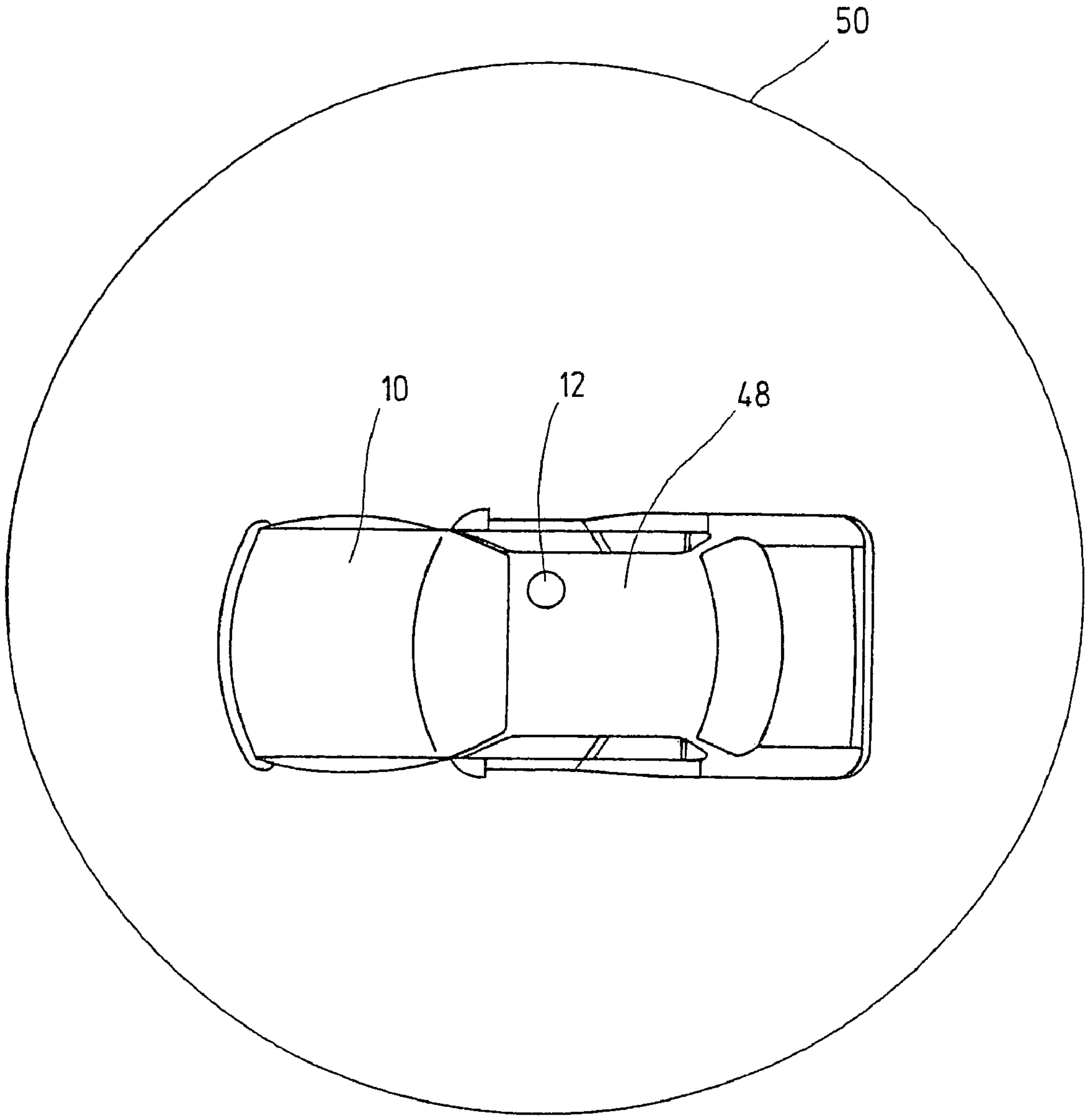
FIG. 1 shows a top view of a motor vehicle having a sensor.

A top view of a motor vehicle 10 is illustrated in FIG. 1. An optical sensor 12 is mounted on roof 48 of motor vehicle 10. Sensor 12 has a visual field 50 of 360°. The illustration of visual field 50 is not true to scale. A two-dimensional image may be produced using a single optical sensor 12, so that a spatial resolution of the vehicle surroundings is not possible using a system according to FIG. 1.

Figure 2:
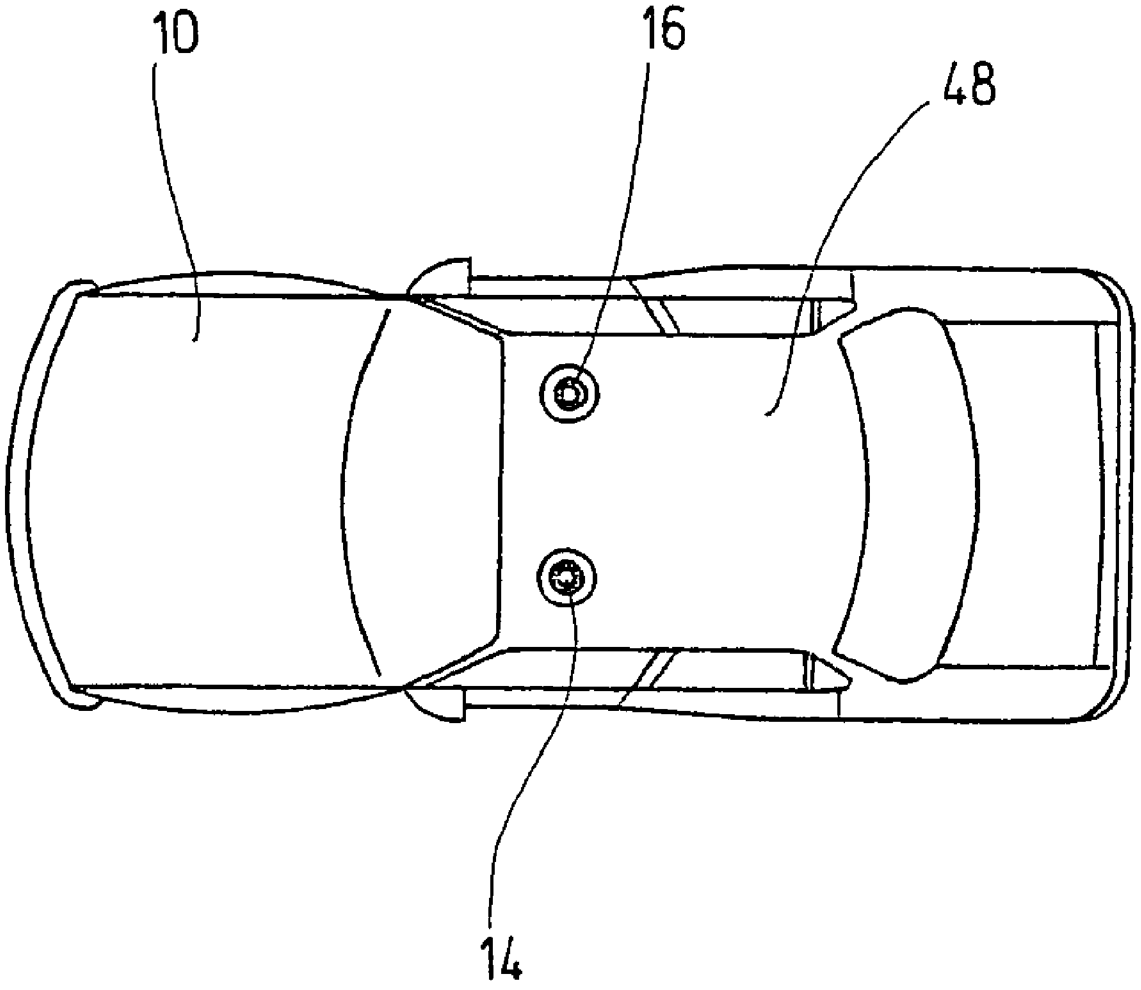
FIG. 2 shows a top view of a motor vehicle having two sensors.

FIG. 2 illustrates a motor vehicle 10 having two sensors 14, 16 mounted on roof 48 of vehicle 10.

Figure 3:
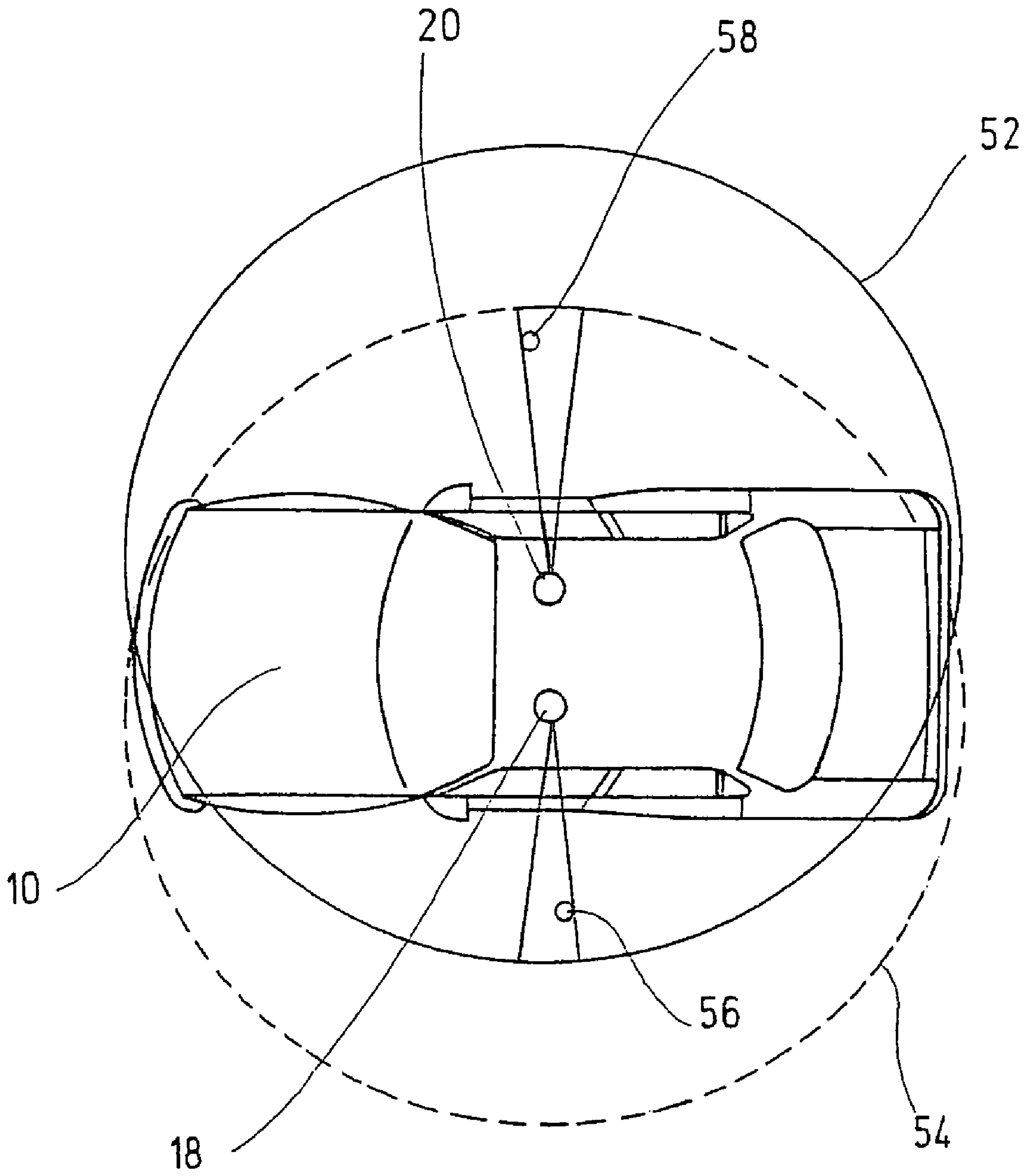
FIG. 3 shows another top view of a vehicle having two sensors.

FIG. 3 likewise shows a vehicle 10 having two sensors 18, 20 on vehicle roof 48, in this case it being additionally illustrated by circles 52, 54 that both sensors 18, 20 have an aperture angle of 360°. Since the two sensors 18, 20 are spaced from one another at a distance, the visual fields of the two sensors 18, 20, symbolized by circles 52, 54, are offset with respect to one another. Stereo surveying of the surroundings is possible in the region of intersection of the two circles 52, 54. Thus, the system according to FIG. 3 enables numerous applications which depend on spatial resolution. In the side region of the vehicle, on the axis of the connecting line between sensors 18, 20, blind spots 56, 58 result because of the mutual shadowing. Stereo measurement is not possible in these blind spots, since in each case one of cameras 18, 20 is shadowed.

Figure 4:
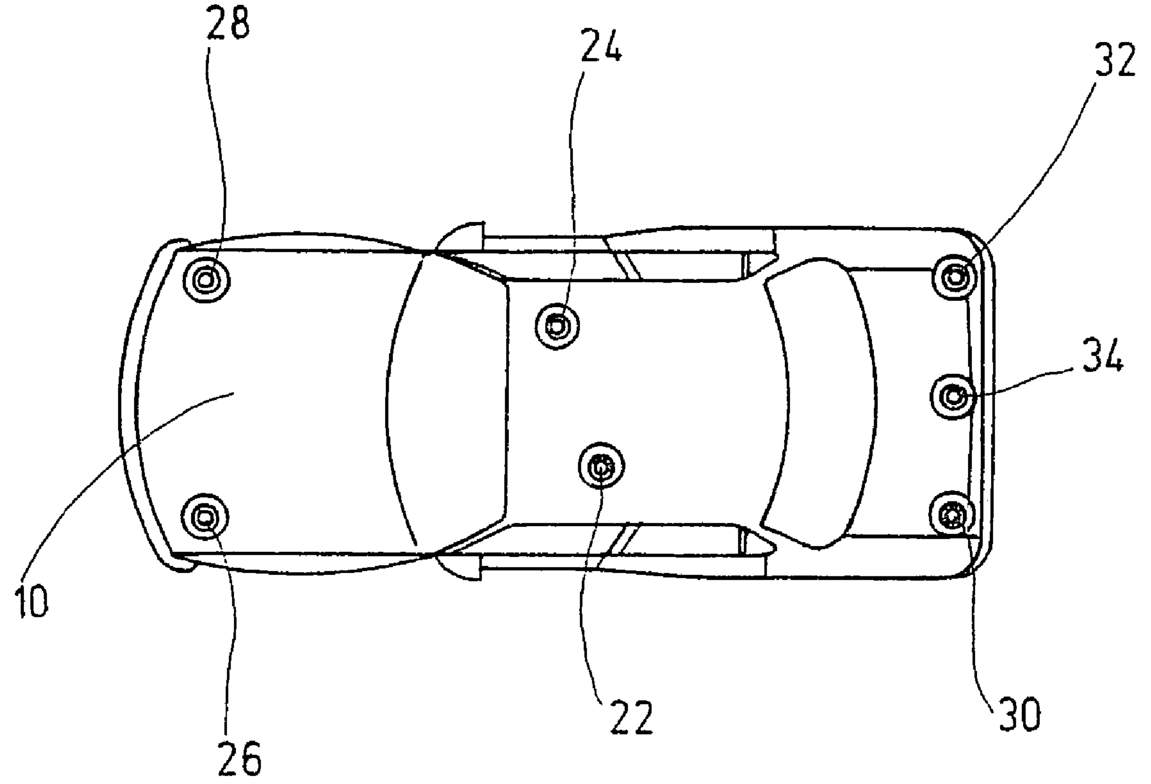
FIG. 4 shows a top view of a vehicle having exemplary systems of sensors.

FIG. 4 shows, among other things, one possibility of avoiding this lateral shadowing. The systems of multiple sensors 22, 24, 26, 28, 30, 32, 34 on a motor vehicle 10 are illustrated in a top view. As a result of the placement of the two sensors 22, 24, which may be provided in addition to or without the other illustrated sensors 26, 28, 30, 32, 34, lateral shadowing may be avoided. Thus, it is possible to perform stereo surveying as a result of the offset placement of sensors 22, 24. This is particularly useful for detecting the blind spot with respect to the visual field of the driver. As an example, two additional cameras 26, 28 in the front region of the motor vehicle are shown which are advantageously combined with a sensor 34 on the rear end of the motor vehicle. Particularly good control for ACC stop and go may be achieved by such a system. It should also be noted that the three-dimensional modeling of the vehicle surroundings may be improved even more by the use of three cameras, i.e., one additional camera as compared to the embodiments according to FIGS. 2 and 3. Similarly, it is possible to mount additional cameras 30, 32 on the rear end of motor vehicle 10, this being suited in particular for applications for detecting the rear field. These cameras 30, 32 as well may be combined with other cameras, for example in the front region of motor vehicle 10.

Figure 5:
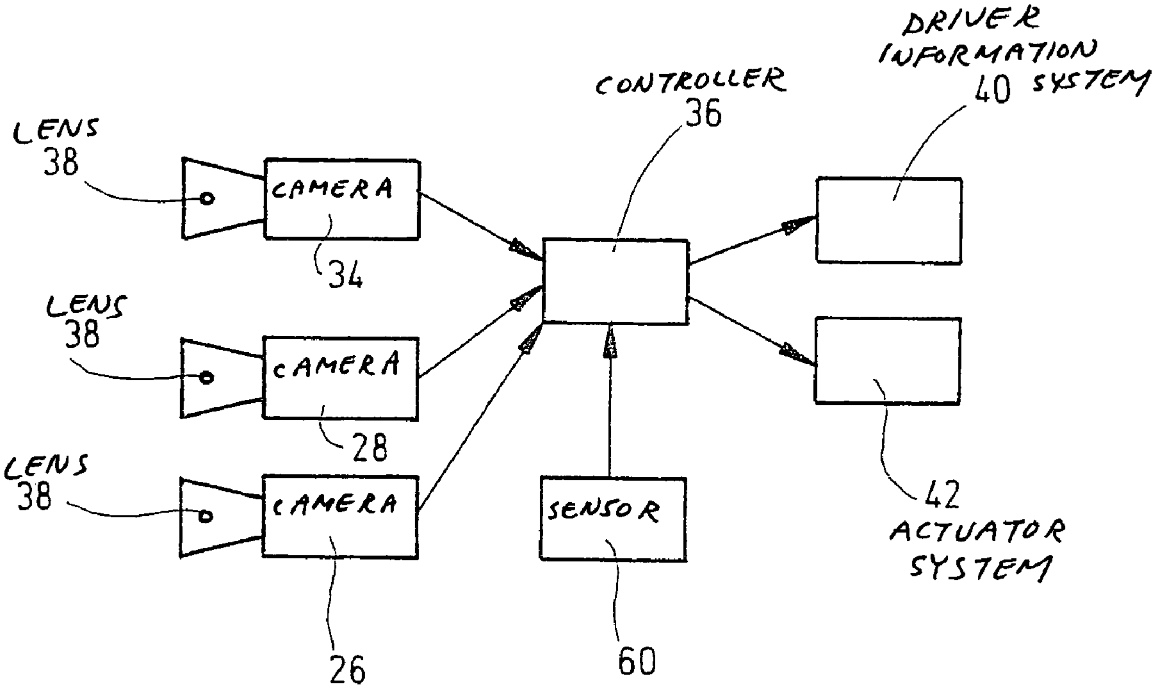
FIG. 5 shows a block diagram for explaining a system according to the present invention.

FIG. 5 shows a block diagram for explaining the present invention. As an example, three cameras 26, 28, 34 are provided which are mounted in the front region and in the rear region, for example, of a motor vehicle. Each of these cameras is equipped with a lens system 38. The information detected by cameras 26, 28, 34 is emitted to a controller 36. Additional information from additional information sources 60, for example from a steering angle sensor, is emittable to controller 36. Controller 36 processes this information using algorithms for digital image processing, in addition to other algorithms, for evaluating the information from sensor 60. The results of these evaluations are sent to a driver information system 40. This system is able to suitably present the information to the driver. The information may be presented by optical, acoustical, or tactile means. Controller 36 may also actively intervene in the vehicle state by actuating one or multiple actuator systems 42. Interventions in the engine control, brakes, clutch, or an alarm system, to name only a few examples, are possible.

Figure 6:
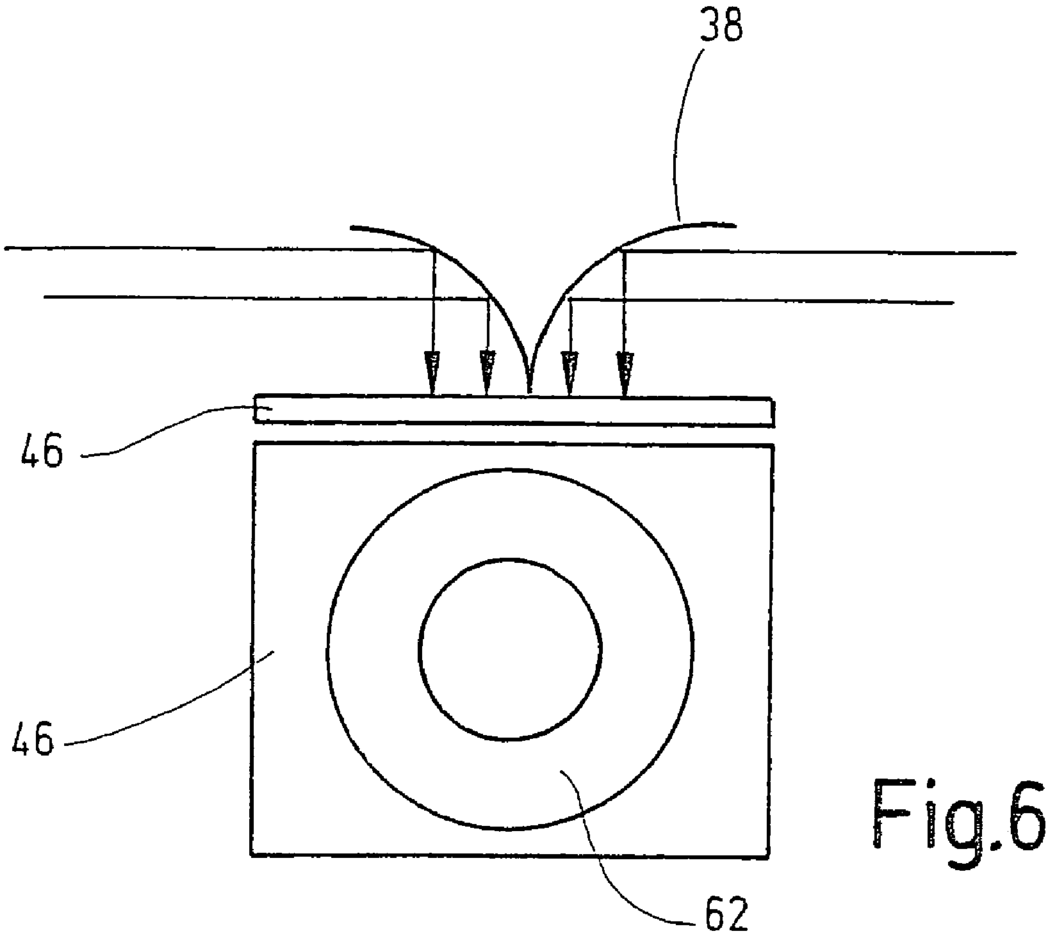
FIG. 6 shows a schematic illustration of a specialized lens system for a system according to the present invention.

The lens system for a sensor in a system according to the present invention is schematically illustrated in FIG. 6. As an example, a parabolic mirror lens system 38 is provided which produces a generally annular image. This image is projected onto an imager chip 46. Imager chip 46 together with annular region 62 is illustrated in the lower part of the figure. The regions situated within annular region 62 and outside annular region 62 are preferably used for other functions, such as for an evaluation logic system.

Figure 7:
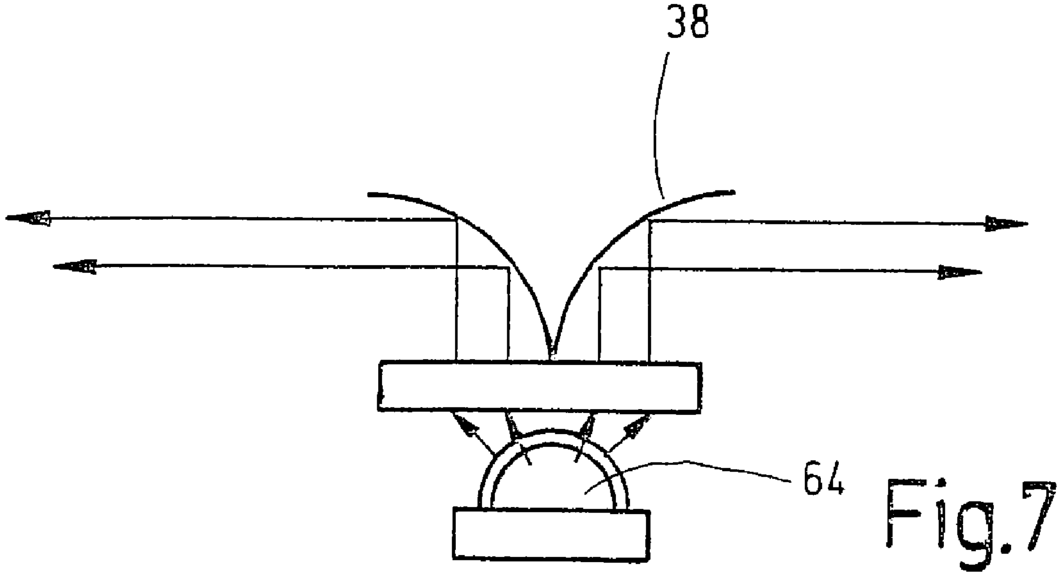
FIG. 7 shows another schematic illustration of a specialized lens system for a system according to the present invention.

FIG. 7 also illustrates a lens system which may be used within the scope of the present invention. Once again, the lens system is a parabolic mirror lens system 38. In this example according to FIG. 7, parabolic mirror lens system 38 is used to emit light, produced by an LED 64, to the surroundings. The surroundings are thus illuminated. The same parabolic mirror lens system 38 used as an example is then used for receiving images from the surroundings. It is particularly advantageous when LED 64 is capable of emitting light which is in the infrared spectral range. The surroundings may thus be illuminated at night, it being possible to detect incident infrared light independently from light source 64.

The previous description of the exemplary embodiments according to the present invention is given for illustrative purposes only, and not for purposes of limiting the present invention. Within the scope of the present invention, various changes and modifications are possible without departing from the scope of the present invention or its equivalents.

What is claimed is:

1. A system for monitoring surroundings of a vehicle, comprising:

at least two optical sensors configured to detect characteristics of the surroundings of the vehicle, the sensors configured to operate in a wide-angle range, wherein each optical sensor includes a sensor lens system having at least one lens that detects characteristics of the surroundings of the vehicle;

an arrangement for producing light in the infrared spectral range, the light being emitted to the surroundings of the vehicle via the at least one lens of the sensor lens system of each optical sensor;

an arrangement for processing the detected characteristics and delivering spatial information based on the detected characteristics; and an imager chip which is sensitive in a near infrared spectral range;

wherein at least one of the optical sensors includes one of a parabolic lens system or a parabolic mirror lens system for detecting a visual angle of 360°, the one of the parabolic lens system or the parabolic mirror lens system produces an approximately annular image on the imager chip in an illuminated region of the imager chip and a remaining region of the imager chip on which the approximately annular image is not formed is used for evaluation logic.

2. The system as recited in claim 1, wherein at least one of the sensors includes a fisheye lens system.

3. A system as recited in claim 1, wherein the sensors act as a pair of stereo cameras.

4. The system as recited in claim 1, further comprising:

additional sensors to detect additional characteristics of the surroundings, the additional sensors configured to supply the additional characteristics to the arrangement for processing the detected additional characteristics.

5. The system as recited in claim 1, further comprising:

additional optical sensors.

6. The system as recited in claim 1, wherein the arrangement for processing the detected characteristics includes a controller.

7. The system as recited in claim 1, wherein the arrangement for processing the detected characteristics is configured to deliver the spatial information to a driver information system.

8. The system as recited in claim 1, wherein the arrangement for processing the detected characteristics is configured to deliver the spatial information to an actuator system.

9. The system as recited in claim 1, wherein the sensors are mounted on a roof of the vehicle.

10. The system as recited in claim 1, wherein the sensors have an unobstructed visual field in a side region of the vehicle.

11. A method for monitoring surroundings of a vehicle, comprising:

optically detecting characteristics of the surroundings using at least two sensors and an imager chip which is sensitive in a near infrared spectral range, the sensors operating in a wide-angle range, wherein each sensor includes a sensor lens system having at least one lens that detects characteristics of the surroundings of the vehicle, at least one of the sensors includes one of a parabolic lens system or a parabolic mirror lens system for detecting a visual angle of 360°, the one of the parabolic lens system or the parabolic mirror lens system produces an approximately annular image on the imager chip in an illuminated region of the imager chip, and a remaining region of the imager chip on which the approximately annular image is not formed is used for evaluation logic;

producing light in an infrared spectral range;

emitting the light to the surroundings of the vehicle via the at least one lens of the sensor lens system of each sensor;

processing the detected characteristics using a processor; and delivering spatial information based on the detected characteristics.

12. The method as recited in claim 11, wherein at least one of the sensors has a fisheye lens system.

13. The method as recited in claim 11, further comprising:

providing additional sensors for detecting additional characteristics of the surroundings; and supplying the additional characteristics to the processor.

14. The method as recited in claim 11, further comprising:

providing additional optical sensors.

15. The method as recited in claim 11, wherein the processor is a controller.

16. The method as recited in claim 11, further comprising:

outputting the processed, detected characteristics to a driver information system.

17. The method as recited in claim 11, further comprising:

outputting the processed, detected characteristics to an actuator system.

18. A method as recited in claim 11, wherein the sensors act as a pair of stereo cameras.

* * * * *